US008831874B1

(12) United States Patent
Pettis

(10) Patent No.: US 8,831,874 B1
(45) Date of Patent: Sep. 9, 2014

(54) QUANTIFYING INTERSECTION COST

(75) Inventor: Nathaniel E. Pettis, San Jose, CA (US)

(73) Assignee: Google Inc., Mountain View, CA (US)

( * ) Notice: Subject to any disclaimer, the term of this patent is extended or adjusted under 35 U.S.C. 154(b) by 110 days.

(21) Appl. No.: 13/464,851

(22) Filed: May 4, 2012

(51) Int. Cl.
    *G01C 21/26* (2006.01)
(52) U.S. Cl.
    USPC .......................................... 701/410; 340/909
(58) Field of Classification Search
    USPC .......... 701/400, 408–410, 532, 533; 340/909, 340/907, 917, 937
    See application file for complete search history.

(56) References Cited

U.S. PATENT DOCUMENTS

| 6,617,981 | B2 * | 9/2003 | Basinger ....................... 340/909 |
| 8,279,086 | B2 * | 10/2012 | Liu et al. ...................... 340/909 |
| 2004/0215389 | A1 * | 10/2004 | Hirose .......................... 701/209 |
| 2010/0079306 | A1 | 4/2010 | Liu et al. |
| 2011/0112760 | A1 | 5/2011 | Serbanescu et al. |

* cited by examiner

*Primary Examiner* — Marthe Marc-Coleman
(74) *Attorney, Agent, or Firm* — McDermott Will & Emery LLP

(57) ABSTRACT

Aspects of the subject technology relate to a systems, methods, and machine-readable media for determining a cost for an intersection. A system may be configured to identify an intersection area for an intersection associated with a set of location signals associated with a user, determine an amount of time the user spent in the intersection area based on a first approaching location signal, a second of approaching location signal, a first departing location signal, and a second departing location signal, and determine, using a processor, a cost for the intersection based on the amount of time the user spent in the intersection area.

15 Claims, 5 Drawing Sheets

400

QUANTIFYING INTERSECTION COST

BACKGROUND

Various applications may be able to determine a route from one point to another. For example, a routing application may be able to calculate a route that represents the shortest distance from an origination point to a destination point. Instead of determining a route between two points with the shortest distance, some routing applications are able to determine a route takes the shortest amount of time to travel from the origination point to the destination point.

In order to determine the routes, the routing applications may access mapping data that includes location points and road segments that are associated with costs related to the amount of time needed to traverse each road segment. For example, a route between two points may be determined by generating a number of candidate routes between the two points and calculating a cost for each candidate route by adding up all of the costs of the road segments that make up the candidate route. A final route may then be selected from the candidate routes based on the costs for the candidate routes.

SUMMARY

Aspects of the subject technology relate to a system for determining a time spent in an intersection. The system may include one or more processors and a machine-readable medium comprising instructions stored therein, which when executed by the one or more processors, cause the one or more processors to perform operations. The operations may include identifying an intersection area for an intersection associated with a set of location signals associated with a user, identifying a first approaching location signal and a second approaching location signal from the set of location signals, wherein the first approaching location signal is outside of the intersection area and the second approaching location signal is within the intersection area, and identifying a first departing location signal and a second departing location signal from the set of location signals, wherein the first departing location signal is within the intersection area and the second departing location signal is outside of the intersection area. The operations may further include determining an amount of time the user spent in the intersection area based on the first approaching location signal, the second of approaching location signal, the first departing location signal, and the second departing location signal and determining, using a processor, a time spent in the intersection based on the amount of time the user spent in the intersection area.

Other aspects of the subject technology relate to a method for determining a time spent in an intersection. The method may include identifying an intersection area for an intersection associated with a set of location signals for a device, identifying a first approaching location signal and a second approaching location signal from the set of location signals, wherein the first approaching location signal is outside of the intersection area and the second approaching location signal is within the intersection area, identifying a first departing location signal and a second departing location signal from the set of location signals, wherein the first departing location signal is within the intersection area and the second departing location signal is outside of the intersection area, and determining, using a processor, a time spent in the intersection based on the first approaching location signal, the second of approaching location signal, the first departing location signal, and the second departing location signal.

Other aspects of the subject technology relate to a machine-readable medium that includes instructions stored therein, which when executed by a machine, cause the machine to perform operations for determining a cost for an intersection. The operations may include identifying an intersection area for an intersection associated with a set of location signals for a device, identifying a first approaching location signal and a second approaching location signal from the set of location signals, wherein the first approaching location signal is outside of the intersection area and the second approaching location signal is within the intersection area, identifying a first departing location signal and a second departing location signal from the set of location signals, wherein the first departing location signal is within the intersection area and the second departing location signal is outside of the intersection area, and determining, using a processor, a cost for the intersection based on the first approaching location signal, the second of approaching location signal, the first departing location signal, and the second departing location signal.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

Routing applications may use mapping data to determine a route between two points, a distance of a route between two points, and/or a relative amount of time needed to travel a route. The mapping data may include location points, road segments, and costs associated with road segments that indicate, for example, the length of a road segment or the time needed to traverse a road segment.

The location points in the mapping data may include intersections that may also be associated with a cost that may be used to factor in the amount of time needed to traverse the intersection. In many cases, the cost for an intersection is a default cost amount for all intersections in the mapping data. However, the default cost may not be an accurate measure of the actual time needed to traverse a particular intersection.

Various aspects of the subject technology are related to determining a cost for an intersection based on location signals (e.g., location coordinates) received from a mobile device. For example, a user's mobile device such as a smart phone, a GPS device, or other location-aware device may travel along a particular route and, over time, obtain a number of location signals along the route. Some of these location signals may correspond to a user traveling through an intersection and may be transmitted to a mapping system to be used to determine a cost for the intersection.

Figure 1:
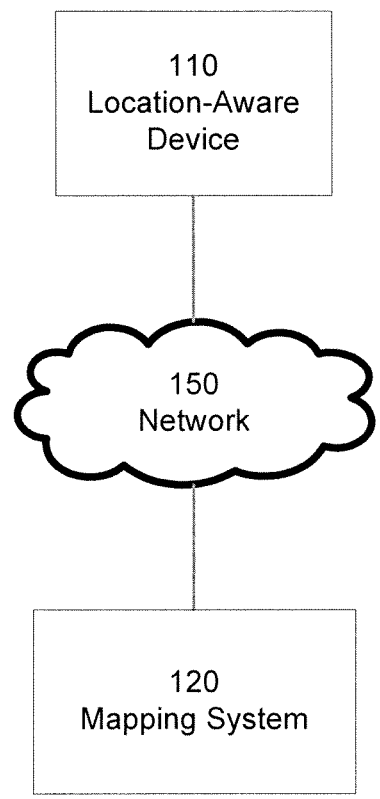
FIG. 1 is a conceptual block diagram illustrating an example network environment in which location signals from a location-aware device may be transmitted to a mapping system.

FIG. 1 is a conceptual block diagram illustrating an example network environment 100 in which location signals from a location-aware device 110 may be transmitted to a mapping system 120. The network environment 100 may include one or more location-aware device 110 connected to a mapping system 120 via a network 150 such as the Internet.

Location-aware devices 110 may be any machine or computing device able to determine its location and generate a location signal to transmit to a mapping system 120 for its location. Each location-aware device 110 may determine its location using any number of methodologies or technologies such as receiving location coordinates from a Global Positioning System (GPS) satellite or determining location coordinates based in cellular towers within range or detected Wi-Fi access points. Location aware devices may include, for example, a smart phone, personal digital assistant (PDA), a GPS device, a computer (e.g., a tablet or laptop), or any other machine capable of transmitting location signals to a mapping system 120.

The one or more location-aware devices 110 may generate location signals along a route being traveled and transmit the location signals to the mapping system 120 via the network 150. According to one aspect, the location signals may be sent to the mapping system 120 as they are obtained by the location-aware devices 110 or in intervals (e.g., transmitting a number of location signals to the mapping system 120 in a batch).

Figure 2:
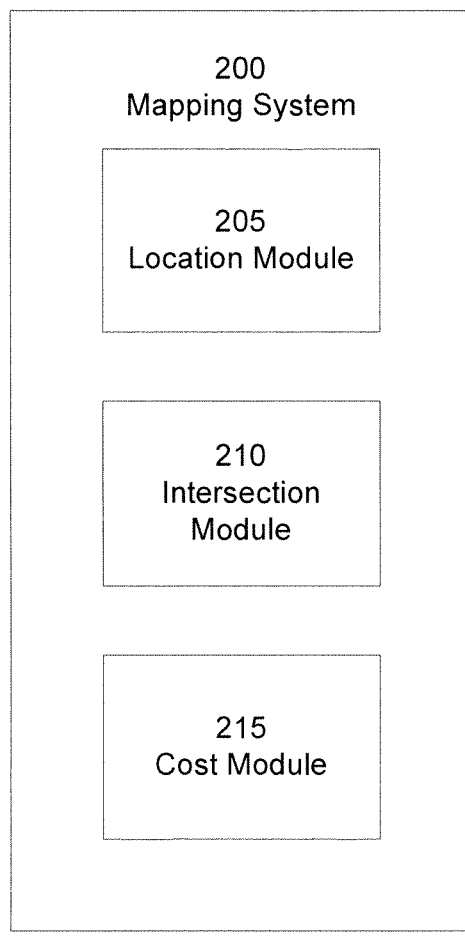
FIG. 2 is a block diagram illustrating an example mapping system configured to determine a cost of an intersection, in accordance with one aspect of the subject technology.

FIG. 2 is a block diagram illustrating an example mapping system 200 configured to determine a cost of an intersection, in accordance with one aspect of the subject technology. The mapping system may include a location module 205, an intersection module 210, and a cost module 215. While the system 200 is shown in one configuration in FIG. 2, in other configurations, the system 200 may include additional, alternative, and/or fewer components.

The location module 205 of the mapping system 200 may be configured to receive location signals from one or more different users. Each of the location signals may be associated with a timestamp that indicates a time the location signal was generated by the user's location-aware device. The location signals and the timestamps for the location signals for each user may be stored in a data repository and later accessed by the intersection module 210 to determine the path of the user.

The intersection module 210 may be configured to identify an intersection that the user has traveled through. For example, the intersection module 210 may retrieve a number of location signals for a particular user or location-aware device stored on the data repository and identify one or more intersections that the user may have traveled through based on the location signals. For example, the intersection module 210 may determine whether one or more of the location signals for the user are located inside a geographic area surrounding an intersection or whether one or more of the location signals are located within a threshold distance of the intersection's location.

Figure 3:
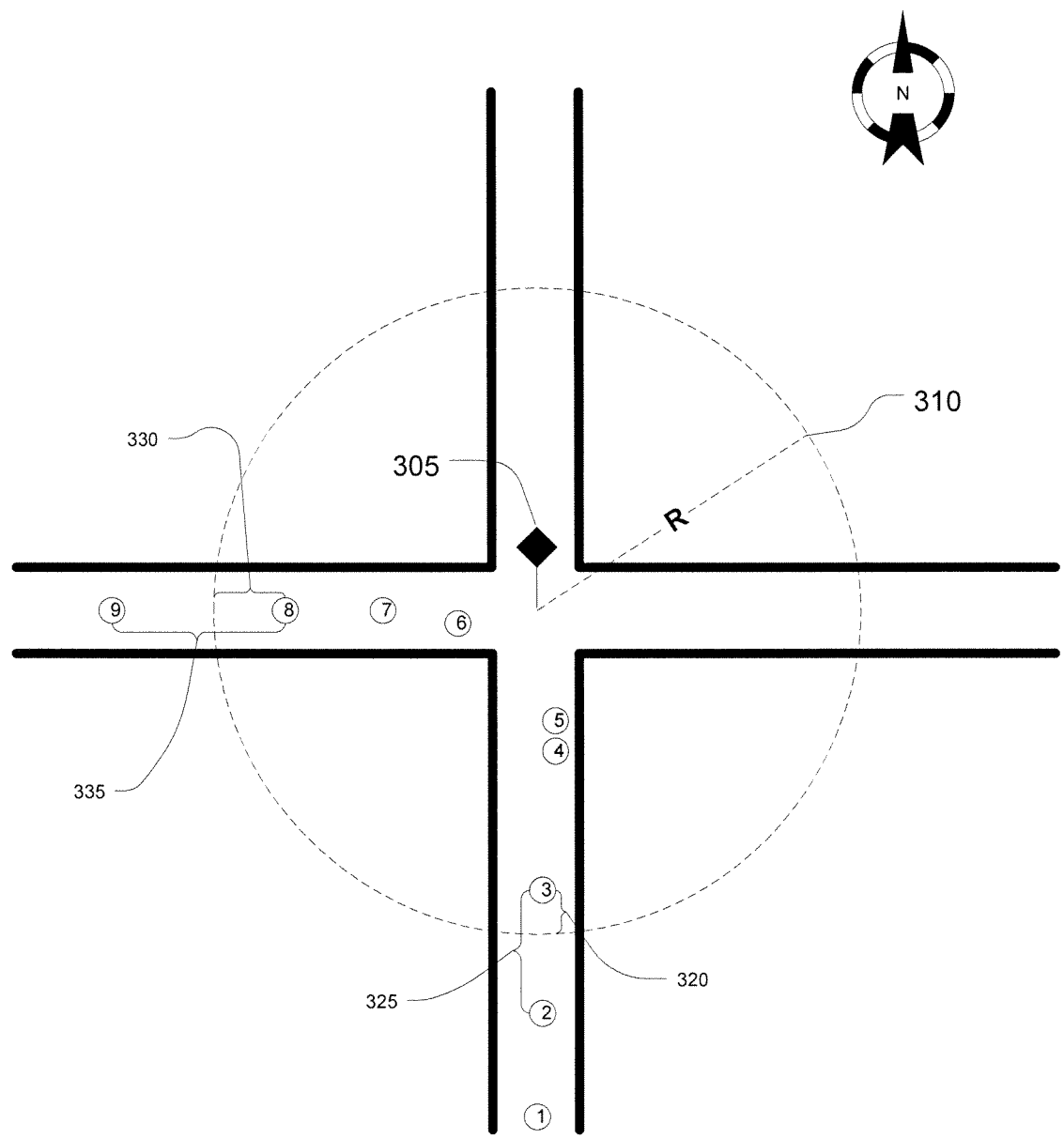
FIG. 3 is a diagram illustrating an example intersection, in accordance with one aspect of the subject technology.

If the intersection module 210 identifies an intersection that the user has traveled through, the cost module 215 may determine a cost for that intersection. According to one aspect, the cost for the intersection may be based on the time it took the user to go through the intersection area (e.g., the time the user spent in a geographical area surrounding the intersection). FIG. 3 may help illustrate this aspect.

FIG. 3 is a diagram illustrating an example intersection 300, in accordance with one aspect of the subject technology. FIG. 3 further shows the location of the intersection 300 (e.g., location coordinates 305 associated with the intersection obtained from the mapping data), an intersection area 310 (the geographical area surrounding the intersection 300), and a number of location signals for a user. In the example illustrated in FIG. 3, the intersection area 310 is defined by the geographical area within a radius R from the location coordinates 305 of the intersection 300. According to other aspects, however, the intersection area 310 may be defined in other ways.

The cost module 215 may calculate the time it took the user to travel through the intersection may be calculated based on the difference in timestamps of the first location signal that is within the intersection area 310 (e.g., location signal 3 in FIG. 3) and the last location signal that is within the intersection area (e.g., location signal 8 in FIG. 3). For example, if the first location signal within the intersection area is associated with a timestamp with time X and the last location signal within the intersection area is associated with a timestamp with time Y, the time it took the user to travel through the intersection may be the amount of time equal to Y−X.

However, this calculation does not take into consideration the time spent traveling from the boundary of the intersection area 310 to the first location signal (e.g., location signal 3) when entering the intersection area 310 and the time spent traveling from the last location signal (e.g., location signal 8) to the boundary of the intersection area 310 when exiting the intersection area 310.

According to various aspects of the subject technology, a more accurate measure of the time spent to travel through an intersection by factoring into the determination of the cost of the intersection, the time spent traveling from the boundary of the intersection area 310 to the first location signal within the intersection area 310 and the time spent traveling from the last location signal within the intersection area 310 to the boundary of the intersection area 310. These additional times may be calculated by using additional location signals such as the location signal preceding the first location signal within the intersection area (e.g., location signal 2 in FIG. 3) and the location signal after the last location signal within the intersection area (e.g., location signal 9 in FIG. 3).

Using the scenario illustrated in FIG. 3, for example, to determine the amount of time the user spent traveling from the boundary of the intersection area 310 to location signal 3, the cost module 215 may first determine the distance 320 between the boundary of the intersection area 310 and location signal 3 and the speed at which the user traveled from the boundary to location signal 3.

In one aspect, the cost module 215 may assume a constant speed of travel between location signal 2 and location signal 3. Accordingly, the speed traveled between the boundary of the intersection area 310 to location signal 3 is equal to the speed traveled between location signal 2 and location signal 3. The system may calculate the speed between location signal 2 and location signal 3 using the distance 325 between the two location signals and the difference between the timestamps associated with the two location signals.

Similarly, the system may assume a constant speed for travel between location signal 8 and location signal 9. Therefore, the time needed to travel between location signal 8 and the boundary of the intersection area 310 may be determined based on the distance 330 between location signal 8 and the boundary of the intersection area 310 and the calculated speed of travel from location signal 8 to location signal 9 (shown as distance 335 in FIG. 3).

The cost module 215 may then determine the total time spent by the user in the intersection area 310 by adding these two time values to the time spent traveling between the first location signal (e.g., location signal 3) and the last location signal (e.g., location signal 8). The cost of the intersection may then be determined based on the total time spend by the user in the intersection area 310.

According to one aspect, the cost for the intersection may be based on an average of all of the times spent traveling through the intersection that were calculated by the cost module 215, which may include times based on location signals of other users. In some aspects, old data (e.g., from location signals generated over two months ago) may be discarded so that the average time spent traveling through the intersection (and the resulting cost for the intersection calculated based on the average time) may be up-to-date.

Once the cost for the intersection is calculated, it may be assigned to the intersection and stored in the mapping data. According to one aspect, the mapping data may include a number of records or listings for points of interest, including intersections. The cost module 215 may identify a record corresponding to a particular intersection and store the calculated cost for the particular intersection in the record for the intersection.

According to one aspect of the subject technology, each record for an intersection may be configured to include a number of costs for the intersection. For example, the record may categorize the costs for an intersection based on a category of time such as a time of day, a particular time interval (e.g., a particular hour of the day), morning and/or evening rush hour, afternoon, days of the week (e.g., Wednesday or the weekend), a holiday, or any other category of time. The record may also categorize the costs for an intersection based on a maneuver (e.g., a right turn, a U-turn, a left turn, straight, etc.), based on an originating and/or departing direction (e.g., east, west, north, south, etc.), or based on another factor.

Using FIG. 3 as an example, the time spent in the intersection area 310 may be used to calculate a cost for the intersection for a left turn, entering the intersection area 310 from the south, and exiting the intersection area 310 to the west. Furthermore, depending on the time and date indicated in the timestamps for the location signals shown in FIG. 3, the time spent in the intersection area 310 may be used to calculate a cost for the intersection for a particular category of time.

Figure 4:
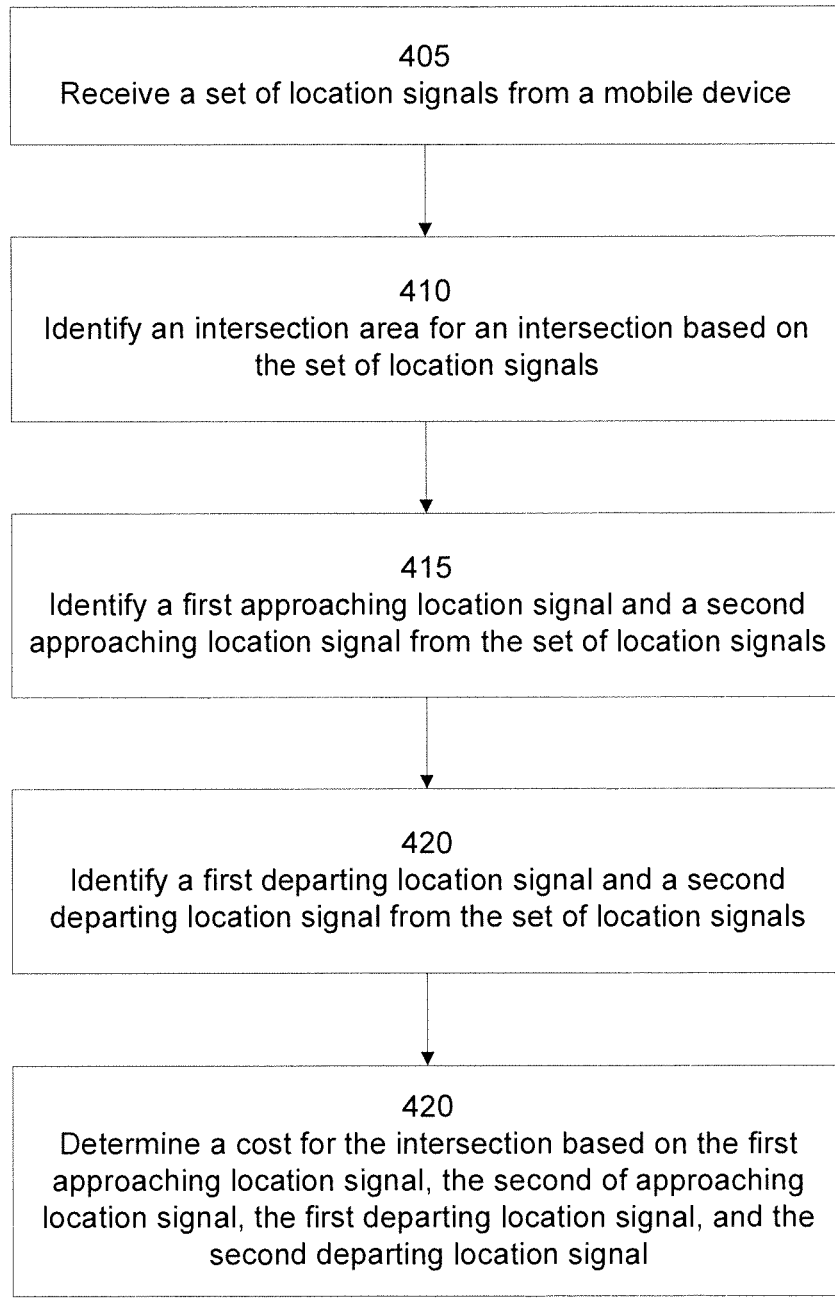
FIG. 4 is a flow chart illustrating a process for determining a cost for an intersection, in accordance with one aspect of the subject technology.

FIG. 4 is a flow chart illustrating a process 400 for determining a cost for an intersection, in accordance with one aspect of the subject technology. Although the steps in process 400 are shown and described in a particular order, certain steps, including steps not shown, may be performed in different orders or at the same time. Furthermore, although the steps are described as being performed by components of the mapping system 200 of FIG. 2, the steps are not limited to being performed by these components and may be performed by other components, other systems, or other entities.

At step 405, the location module 205 may receive a set of location signals from a mobile device. The mobile device may be, for example, a user's smart phone, a GPS device in an automobile, or any other location-aware device. Each of the location signals may include location coordinates for the mobile device and a timestamp corresponding to the location coordinates. In some cases, the location signals may be put into a sequence based on their corresponding timestamps. The set of location signals may be received all at once or one at a time, and stored in a data repository for analysis at a later time.

The intersection module 210, at step 410, may access the mapping data and identify an intersection area for an intersection in the mapping data based on the set of location signals. For example, an identified intersection area may have one or more location signals located inside or one or more location signals may be within a specific distance of the location coordinates for the intersection.

After the intersection area is identified, at step 415, the cost module 215 may identify a first approaching location signal and a second approaching location signal from the set of location signals. Approaching location signals may be considered location coordinates in a sequence of location signals that are approaching the location coordinates of the intersection. The cost module 215 may identify a pair consecutive approaching location signals, where the first approaching location signal is outside an intersection area of the intersection and the second approaching location signal is inside the intersection area.

For example, referring to FIG. 3, location signals 1, 2, 3, 4, and 5 are approaching location signals because, based on their location coordinates and timestamps, they are approaching the location coordinates 305 of the intersection 300. The cost module 215 may identify location signal 2 as the first approaching location signal because location signal 2 is outside the intersection area 310 and the next location signal in the sequence (location signal 3) is inside the intersection area 310. Accordingly, location signal 3 may be identified as the second approaching location signal.

According to one aspect, the cost module 215, at step 220, may also identify a first departing location signal and a second departing location signal from the set of location signals. Departing location signals may be considered location coordinates in a sequence of location signals that are departing or leaving the intersection. The cost module 215 may identify a pair consecutive departing location signals, where the first departing location signal is inside an intersection area of the intersection and the second departing location signal is outside the intersection area.

Again, referring to FIG. 3, for example, location signals 6, 7, 8, and 9 are departing location signals because, based on their location coordinates and timestamps, they are getting farther away from the location coordinates 305 of the intersection 300. The cost module 215 may identify location signal 8 as the first departing location signal because location signal 8 is inside the intersection area 310 and the next location signal in the sequence (location signal 9) is outside the intersection area 310. Accordingly, location signal 9 may be identified as the second departing location signal.

At step 420, the cost module 215 may determine, using a processor, a cost for the intersection based on the first approaching location signal, the second of approaching location signal, the first departing location signal, and the second departing location signal. In one aspect, the cost for the intersection is calculated based on the total amount of time a user spent in the intersection area which may be determined based on the pair of approaching location signals and the pair of departing location signals.

For example, the cost module 215 may determine a first amount of time that the user spent traveling from an entrance point of the intersection area to the second approaching location signal located within the intersection area, a second amount of time that the user spent traveling from the second approaching location signal to the first departing location signal within the intersection area, and a third amount of time that the user spent traveling from the first departing location signal within the intersection area to an exit point of the intersection area. The total amount of time the user spent in the intersection area may be equal to the sum of the first, the second, and the third amounts of time.

The second amount of time (e.g., the time spent traveling from the second approaching location signal to the first departing location signal within the intersection area) may be determined based on the difference between the timestamps of the second approaching location signal and the first departing location signal. The first amount of time (e.g., the time spent traveling from an entrance point of the intersection area to the second approaching location signal located within the intersection area) and the third amount of time (e.g., spent traveling from the first departing location signal within the intersection area to an exit point of the intersection area) may be computed differently, however, because the exact time the user entered and exited the intersection area may not be known.

Accordingly, the first amount of time may be determined by calculating the distance between the entrance point of the intersection area to the second approaching location signal and the average speed of travel between the first approaching location signal and the second approaching location signal and inputting the values into the equation:

$$\text{Time1} = \frac{\text{Distance1}}{\text{Speed1}} \qquad \text{Equation(1)}$$

where Time1 is the first amount of time, Distance1 is the distance between the entrance point of the intersection area to the second approaching location signal, and Speed1 is the average speed of travel between the first approaching location signal and the second approaching location signal.

The second amount of time may be determined by calculating the distance between the first departing location signal and the exit point of the intersection area and the average speed of travel between the first departing location signal and the second departing location signal and inputting the values into the equation:

$$\text{Time3} = \frac{\text{Distance3}}{\text{Speed3}} \qquad \text{Equation(2)}$$

where Time3 is the third amount of time, Distance3 is the distance between the first departing location signal and the exit point of the intersection area, and Speed3 is the average speed of travel between the first departing location signal and the second departing location signal.

According to one aspect, the cost for an intersection may be determined based on a times spent traveling through the intersection area calculated on a number of other sets of location signals as well. For example, an average amount of time needed to travel through the intersection area may be calculated and used to determine the cost for the intersection. In some cases, only recently determined times may be used to calculate the average amount of time in order to make sure the average amount of time needed to travel through the intersection is up to date and reliable.

It should be understood that the location signals and location coordinates discussed herein may be obtained from various technologies or methodologies. Regardless of how location data is obtained, appropriate efforts may be taken to protect user privacy rights. For example, collection of location data may be on an opt-in basis so that data is not collected unless the user has granted permission, with the location data stored and handled in a secure manner. Additionally, steps can be taken to anonymize the location data (e.g., to ensure that the location data cannot be tied to a particular user and/or to a particular device).

Figure 5:
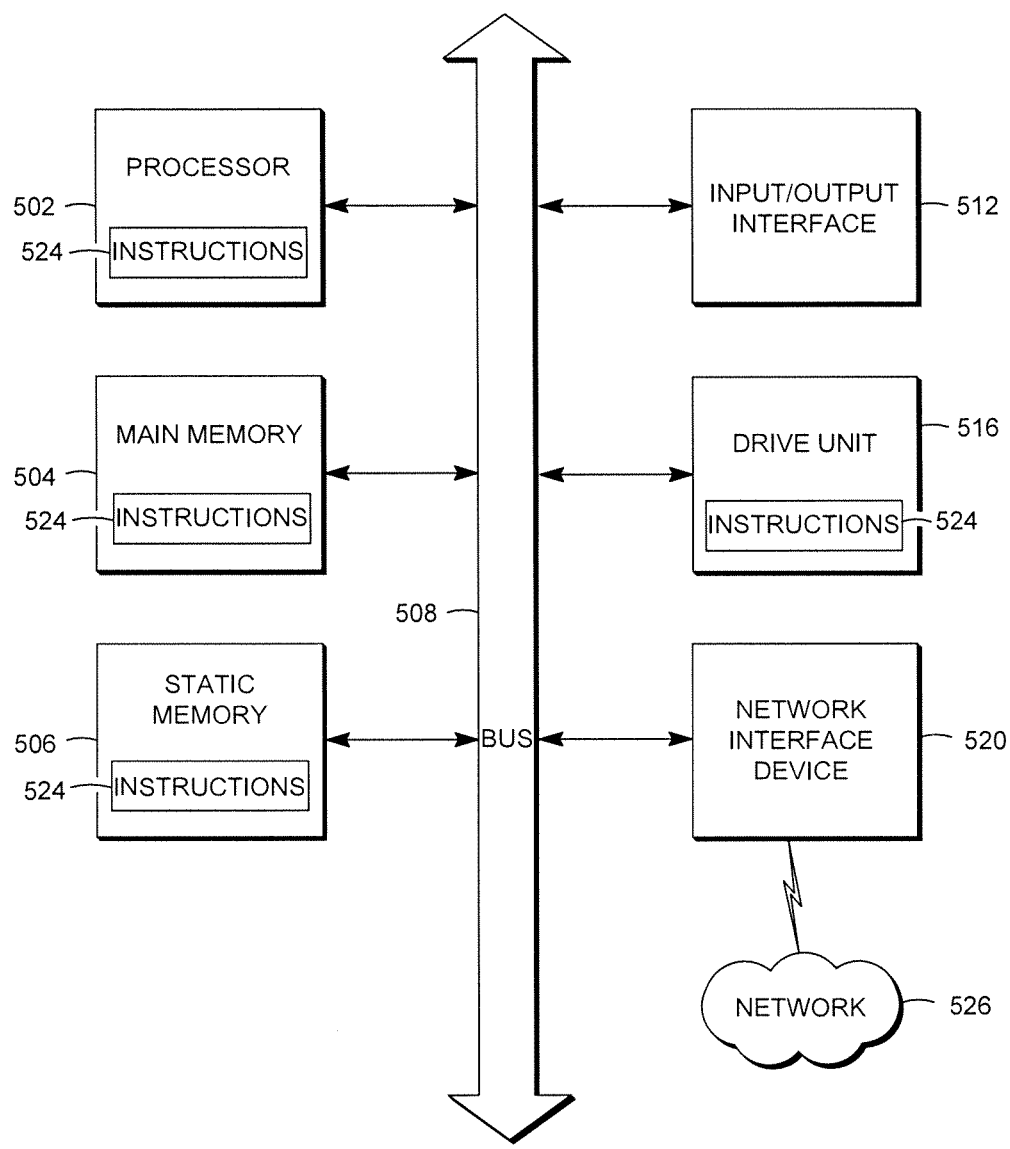
FIG. 5 is a block diagram illustrating a computer system in which any of the systems of devices described herein may be implemented, according to one aspect.

FIG. 5 is a block diagram illustrating a computer system in which any of the systems of devices described herein may be implemented, according to one aspect. In certain aspects, the computer system 500 may be implemented using hardware or a combination of software and hardware, either in a dedicated server, or integrated into another entity, or distributed across multiple entities.

The example computer system 500 includes a processor 502, a main memory 504, a static memory 506, a disk drive unit 516, and a network interface device 520 which communicate with each other via a bus 508. The computer system 500 may further include an input/output interface 512 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 502 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 524 embodying any one or more of the methodologies or functions described herein. The instructions 524 may also reside, completely or at least partially, within the main memory 504 and/or within the processor 502 during execution thereof by the computer system 500, with the main memory 504 and the processor 502 also constituting machine-readable media. The instructions 524 may further be transmitted or received over a network 526 via the network interface device 520.

The machine-readable medium may be a single medium or multiple media (e.g., a centralized or distributed database, and/or associated caches and servers) that store the one or more sets of instructions. The machine-readable medium may comprise the drive unit 516, the static memory 506, the main memory 504, the processor 502, an external memory connected to the input/output interface 512, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

What is claimed is:

1. A computer-implemented method for determining a time spent in an intersection, the method comprising:
    identifying an intersection area for an intersection associated with a set of location signals for a device;
    identifying a first approaching location signal and a second approaching location signal from the set of location signals, wherein the first approaching location signal is outside of the intersection area and the second approaching location signal is within the intersection area;
    identifying a first departing location signal and a second departing location signal from the set of location signals, wherein the first departing location signal is within the intersection area and the second departing location signal is outside of the intersection area;
    determining, using a processor, a first amount of time a user spent traveling from an entrance point of the intersection area to the second approaching location signal based on a speed of travel between the first approaching location signal and the second approaching location signal;
    determining, using the processor, a second amount of time the user spent traveling from the second approaching location signal to the first departing location signal;
    determining, using the processor, a third amount of time the user spent traveling from the first departing location signal to an exit point of the intersection area based on a speed of travel between the first departing location signal and the second departing location signal; and
    determining, using the processor, a time spent in the intersection based on the first amount of time, the second amount of time, and the third amount of time.

2. The computer-implemented method of claim 1, wherein the first approaching location signal and the second approaching location signal are consecutive location signals in the set of location signals, and wherein the first departing location signal and the second departing location signal are consecutive location signals in the set of location signals.

3. The computer-implemented method of claim 1, wherein the identifying of the intersection area for the intersection associated with the set of location signals comprises determining that at least one location signal in the set of location signals is within the intersection area.

4. The computer-implemented method of claim 1, wherein at least one location signal in the set of location signals is a Global Positioning System (GPS) location signal.

5. The computer-implemented method of claim 1, wherein the intersection area for the intersection is defined as an area within a threshold distance of location coordinates for the intersection.

6. The computer-implemented method of claim 1, further comprising storing the time spent in the intersection in a record for the intersection located in a mapping data repository.

7. The computer-implemented method of claim 1, wherein the time spent in the intersection is associated with a particular maneuver at the intersection.

8. The computer-implemented method of claim 1, wherein the time spent in the intersection is associated with a particular category of time.

9. A system for determining a time spent in an intersection, the system comprising:
one or more processors; and
a non-transitory machine-readable medium comprising instructions stored therein, which when executed by the one or more processors, cause the one or more processors to perform operations comprising:
identifying an intersection area for an intersection associated with a set of location signals associated with a user;
identifying a first approaching location signal and a second approaching location signal from the set of location signals, wherein the first approaching location signal is outside of the intersection area and the second approaching location signal is within the intersection area;
identifying a first departing location signal and a second departing location signal from the set of location signals, wherein the first departing location signal is within the intersection area and the second departing location signal is outside of the intersection area;
determining a first period of time a user spent traveling from an entrance point of the intersection area to the second approaching location signal based on a speed of travel between the first approaching location signal and the second approaching location signal;
determining a second period of time the user spent traveling from the second approaching location signal to the first departing location signal;
determining a third period of time the user spent traveling from the first departing location signal to an exit point of the intersection area based on a speed of travel between the first departing location signal and the second departing location signal; and
determining an amount of time the user spent in the intersection area based on the first period of time, the second period of time, and the third period of time.

10. The system of claim 9, wherein the first approaching location signal and the second approaching location signal are consecutive location signals in the set of location signals, and wherein the first departing location signal and the second departing location signal are consecutive location signals in the set of location signals.

11. The system of claim 9, wherein the identifying of the intersection area for the intersection associated with the set of location signals comprises:
determining that location coordinates for the intersection are within a threshold distance of at least one location signal in the set of location signals; and
identifying, in response to the determining that the location coordinates for the intersection are within the threshold distance of the at least one location signal, the intersection area for the intersection.

12. The system of claim 9, wherein the time spent in the intersection is associated with at least one of a particular maneuver at the intersection or a particular category of time.

13. The system of claim 9, wherein each location signal in the set of location signals is associated with a timestamp.

14. A non-transitory machine-readable medium comprising instructions stored therein, which when executed by a machine, cause the machine to perform operations comprising:
identifying an intersection area for an intersection associated with a set of location signals for a device;
identifying a first approaching location signal and a second approaching location signal from the set of location signals, wherein the first approaching location signal is outside of the intersection area and the second approaching location signal is within the intersection area;
identifying a first departing location signal and a second departing location signal from the set of location signals, wherein the first departing location signal is within the intersection area and the second departing location signal is outside of the intersection area;
determining a first amount of time a user spent traveling from an entrance point of the intersection area to the second approaching location signal based on a speed of travel between the first approaching location signal and the second approaching location signal;
determining a second amount of time the user spent traveling from the second approaching location signal to the first departing location signal;
determining a third amount of time the user spent traveling from the first departing location signal to an exit point of the intersection area based on a speed of travel between the first departing location signal and the second departing location signal; and
determining a cost for the intersection based on a time spent by a user in the intersection, wherein the time is based on the first amount of time, the second amount of time, and the third amount of time.

15. The non-transitory machine-readable medium of claim 14, wherein the identifying of the intersection area for the intersection associated with the set of location signals comprises:
determining that location coordinates for the intersection are within a threshold distance of at least one location signal in the set of location signals; and
identifying, in response to the determining that the location coordinates for the intersection are within the threshold distance of the at least one location signal, the intersection area for the intersection.

* * * * *